Feb. 15, 1927.
E. C. BAYNES
NUT LOCK
Filed June 27, 1925
1,617,317
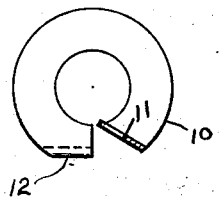
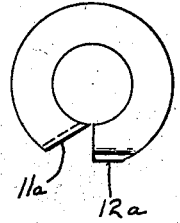
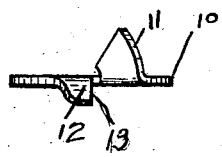
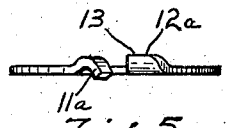
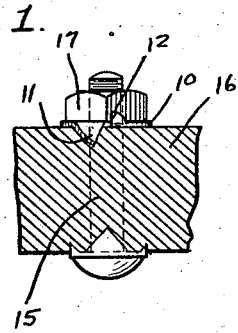
INVENTOR.
Edward C. Baynes
BY Francis D. Hardesty
ATTORNEY.

Patented Feb. 15, 1927.

1,617,317

UNITED STATES PATENT OFFICE.

EDWARD C. BAYNES, OF BIRMINGHAM, MICHIGAN.

NUT LOCK.

Application filed June 27, 1925. Serial No. 39,968.

The present invention relates to nut locks and has among its objects a lock particularly adapted to secure a nut applied to a bolt projecting through a flat surface.

Another object is a device of the kind mentioned which shall be economical to produce and efficient in operation.

Reference should be made to the following description and accompanying drawing in which:

Fig. 1 shows one of the present devices applied to a bolt and nut.

Fig. 2 is a plan view of a lock looking at the under side as seen in Fig. 1.

Fig. 3 is a side view of the device somewhat enlarged, and reversed as compared with Fig. 1.

Fig. 4 is a view similar to Fig. 2, of a modified form of the lock.

Fig. 5 is a side view of the same.

As indicated in Figs. 1, 2, and 3 of the drawings, the device may consist of a washer 10 which is cut radially and has one of the ends so formed turned at approximately a right angle to the plane of the washer, thereby forming a pointed tang 11. The line of the angle so formed is preferably such that the sides of the pointed tang 11 slope approximately equally. The other end formed by the cut has its outside corner turned in the opposite direction to tang 11 on a line approximately perpendicular to the line of the cut, thereby forming a stop shoulder 12, which has a straight side 13.

In the use of this form of the device, it is slipped on a bolt 15 projecting through a wood or other comparatively soft surface 16 with the tang 11 toward the wood. The nut 17 is then screwed down to engage the device. This operation causes the tang 11 to be pressed into the wood to hold the washer against turning. When this happens, the washer is expanded and the shoulder 12 is sprung outwardly by the nut 17 in passing and thus permits the nut to be screwed down tightly. The shape of the shoulder 12 is such that a corner of the nut in tightening presses against the face of the shoulder and cams it outwardly while the untightening movement presses a flat side of the nut against the abrupt vertical edge of the shoulder, thus effectively preventing the backward movement.

The modified form of the device shown in Figs. 4 and 5 is adapted to be used with metal surfaces and in this form there is the same expanding action caused by the nut on the shoulder $12^a$. The washer is held at the other end by a tang $11^a$ which is formed with a hump or elevation 13 as shown best in Fig. 5. As the nut rides up on this hump, the end of tang $11^a$ is forced against or into the surface against which it lies and prevents the washer from turning while the nut is forcing outwardly the shoulder $12^a$.

Having now described the invention and the preferred form of embodiment of the same it is to be understood that it is not to be limited to the precise details shown and described but only by the scope of the claims which follow:

Claims:

1. A nut lock for bolts projecting through wood or other comparatively soft surfaces, consisting of a washer cut radially to form two ends, one of which is turned down from the plane of the washer on a line such that the sides of the point so produced slope substantially equally, and the other of which is turned up on a line perpendicular to the cut and intermediate the ends thereof.

2. A nut lock for bolts projecting through wood or other comparatively soft surfaces, consisting of a washer cut radially to form two ends, one of which is turned down at approximately a right angle to the plane of the washer on a line such that the sides of the point so produced slope substantially equally, and the other of which is turned up at a right angle on a line perpendicular to the cut and intermediate the ends thereof.

3. A nut lock consisting of a washer cut radially to form two ends, one of which is turned up at a right angle on a line perpendicular to the cut and intermediate the ends thereof and the other end of which is turned down to form a tang adapted to bite into a flat surface and preventing turning of the washer when a nut is acting against the turned up end.

EDWARD C. BAYNES.